United States Patent [19]

Laycock et al.

[11] Patent Number: 5,374,705
[45] Date of Patent: Dec. 20, 1994

[54] PROCESS FOR THE PREPARATION OF POLYETHER POLYOLS WITH A REDUCED UNSATURATION CONTENT

[75] Inventors: David E. Laycock, Lambton, Canada; Robert A. Sewell, Terneuzen, Netherlands

[73] Assignee: The Dow Chemical Company, Midland, Mich.

[21] Appl. No.: 174,553

[22] Filed: Dec. 27, 1993

[51] Int. Cl.$^5$ .............................................. C08G 18/32
[52] U.S. Cl. ...................................... 528/77; 564/505; 568/617; 568/619; 568/620
[58] Field of Search .......................... 528/77; 564/505; 568/617, 619, 620

[56] References Cited

U.S. PATENT DOCUMENTS

| | | | |
|---|---|---|---|
| 4,223,164 | 3/1980 | Yang et al. | 528/76 |
| 4,239,917 | 12/1980 | Yang | 528/76 |
| 4,302,613 | 10/1981 | Yang et al. | 528/76 |
| 4,306,093 | 1/1981 | Yang et al. | 528/76 |
| 4,376,868 | 11/1983 | Nield et al. | 528/76 |
| 4,453,022 | 8/1984 | McCain et al. | 528/76 |
| 4,453,023 | 5/1984 | McCain et al. | 528/76 |
| 5,010,187 | 1/1991 | Heuvelsland | 528/76 |
| 5,070,125 | 1/1991 | Heuvelsland | 528/76 |
| 5,114,619 | 3/1992 | Heuvelsland | 528/76 |
| 5,162,589 | 7/1992 | Wijngaarden et al. | 528/76 |
| 5,220,077 | 6/1993 | Sandoval et al. | 528/76 |

FOREIGN PATENT DOCUMENTS

| | | |
|---|---|---|
| 0026544 | 1/1981 | European Pat. Off. . |
| 0026546 | 1/1981 | European Pat. Off. . |
| 0026547 | 1/1981 | European Pat. Off. . |
| 0033760 | 5/1981 | European Pat. Off. . |
| 0034650 | 6/1981 | European Pat. Off. . |
| 0034648 | 10/1981 | European Pat. Off. . |
| 0046947 | 2/1982 | European Pat. Off. . |
| 0049358 | 5/1982 | European Pat. Off. . |
| 0115083 | 1/1984 | European Pat. Off. . |

Primary Examiner—Maurice J. Welsh

[57] ABSTRACT

Polyether polyols are by reacting an alkylene oxide comprising propylene oxide with an initiator containing at least three active hydrogen atoms per molecule. The reaction is conducted in the presence of an alkoxylation catalyst which is barium, strontium and their oxides, hydroxides, hydrated hydroxides or monohydroxide salts, or mixtures thereof; and in the presence of from about 1 to about 10 weight percent, based on total weight of initiator, of a processing aid that is an organic monohydroxyl- or dihydroxyl-containing substance having a molecular weight of at least 30, or a mixture thereof. The processing aid enhances the ability to obtain polyether polyols having a reduced unsaturation content.

20 Claims, No Drawings

PROCESS FOR THE PREPARATION OF POLYETHER POLYOLS WITH A REDUCED UNSATURATION CONTENT

BACKGROUND OF THE INVENTION

This invention relates to a process for the preparation of a polyether polyol that has a reduced unsaturation content.

Polyether polyols suitable for use in preparing polyurethanes are usually prepared by the reacting in the presence of a basic alkoxylation catalyst an initiator compound having active hydrogen atoms with an alkylene oxide such as, for example, ethylene oxide or especially propylene oxide. Typical catalysts include tertiary amines, or hydroxide or alkoxide of sodium and potassium. However, under the overall conditions of the reaction including catalyst concentration, elevated temperature and pressure, the propylene oxide may isomerize and rearrange to give an allyl alkoxide before it can react with the initiator. The ability to prepare high equivalent weight polyether polyols in the presence of the allyl alkoxide is reduced as the allyl alkoxide competes in reaction for the remaining alkylene oxide, thereby limiting molecular weight build up on the initiator. The allyl adduct is commonly described as the unsaturation content of a polyether polyol.

When a high equivalent weight polyether polyol having a high unsaturation content is used in the preparation of, for example, a flexible polyurethane foam, a product with undesirable properties can result. Problems such as foam discoloration, inferior compressive and tensile strengths, low reactivity, low flexural modulus and poor humid aging may be observed. It would therefore be desirable to provide a means for preparing a polyether polyol having a reduced unsaturation content, permitting the manufacture of improved polyurethane polymers.

It is known from the art that the unsaturation content of a polyether polyol may be reduced by a subsequent acid treatment such as discussed by Dege et al., *Journal of the American Chemical Society*, p. 3374, Vol. 81 (1959), or as disclosed in U.S. Pat. Nos. 2,996,550 and 3,271,462. However, such acid treatment of polyether polyols is not always practical, adding to production costs and generating waste products which must be subsequently removed from the polyols and discarded. Accordingly, it would be more desirable to provide a means of preparing a polyether polyol in which the accompanying buildup of unsaturation during its manufacture is avoided or minimized.

The art contains various disclosures which teach the selection of certain substances functioning as alkoxylation catalyst, when preparing polyether polyols, and which additionally minimize formation of unsaturated substances. U.S. Pat. Nos. 3,393,243 discloses the use of cesium hydroxide for the preparation of polyoxypropylene polyether polyols having an equivalent weight of from 1500 to 2500 and reduced levels of unsaturation. U.S. Pat. No. 5,010,187 discloses the use of barium- or strontium-containing substances for a similar purpose. In an improvement of this latter disclosure, U.S. Pat. No. 5,114,619 discloses the controlled concomitant addition of limited amounts of water during addition of the alkylene oxide to provide for a further reduction in the unsaturation content of polyether polyols prepared in the presence of such barium- or strontium-containing catalyst substances. It is also reported that substitution of water by low molecular weight diols or triols does not provide for a reduction in the unsaturation content of the resulting polyether polyol. While studying further this latter improved process the present inventors have confirmed the value of water when preparing a polyether triol having a low unsaturation content, but are unable to observe a similar reduction of unsaturation content when preparing a polyether diol. Further investigation of this observation has led to the present discovery.

SUMMARY OF THE INVENTION

It has now been discovered that polyether polyols having a reduced unsaturation content can be prepared when using catalysts containing the alkaline earth metals, barium and strontium, and when the alkoxylation of the initiator is conducted in the presence of certain hydroxyl-containing substances.

In a first aspect, this invention is a process for preparing a polyether polyol having an equivalent weight of from about 800 to about 4000 by reacting an initiator containing at least three active hydrogen-atoms per molecule with an alkylene oxide comprising propylene oxide or butylene oxide in the presence of a catalyst and a processing aid wherein:

a) the catalyst is selected from barium, strontium and their oxides, hydroxides, hydrated hydroxides or monohydroxide salts, or mixtures thereof; and b) the processing aid, having a molecular weight of at least 30 and being an organic monohydroxyl- or dihydroxyl-containing substance or mixtures thereof, is present in from about 1 to about 10 weight percent based on total weight of initiator.

In a second aspect, this invention is a polyol produced by the process of the invention.

In a third aspect, this invention is a polymer containing urethane linkages prepared by reacting an organic isocyanate with a polyol prepared by the process of the invention.

Surprisingly, it is found that when polyether polyols are prepared according to the invention that they have an unexpectedly low unsaturation content. The addition of water to obtain a product with a reduced unsaturation content is not required; apart from the residual water content of reactants no further water need be added.

DETAILED DESCRIPTION OF THE INVENTION

In the process of this invention a polyether polyol is prepared by reacting an active hydrogen-containing initiator with an alkylene oxide in the presence of a barium- or strontium-containing catalyst and a hydroxyl-containing compound, other than water.

Active atoms for the purpose of this invention are defined as those hydrogen atoms which react positively in the well-known Zerewitinoff test. See Kohler, *Journal of the American Chemical Society*, p. 3181, Vol. 49 (1927). Representative active atoms include those associated with —OH, —COOH, —SH and —NHR where R can be hydrogen, alkyl, cycloalkyl and aryl aromatic functionality. Preferred active atoms for use in this present invention are those of hydroxyl groups.

Suitable initiators for use in the process of this invention include those having from about 3, and preferably up to about 8, more preferably up to about 6 active hydrogen atoms per molecule. The suitable initiators advantageously have an equivalent weight of from about 50 to about 750, preferably from about 75, and preferably up to about 500, more preferably up to about 300. Typically such initiators include aromatic or aliphatic amines and aromatic polyols, and preferably are aliphatic or carbohydrate polyols or mixtures thereof. Exemplary of suitable aliphatic or carbohydrate polyol initiators include glycerine, trimethylolpropane, methylglucoside, beta-(2-hydroxyethyl)glucoside, sorbitol, sucrose, or oxyalkylene adducts thereof. Preferred initiators are glycerine, trimethylolpropane, and low molecular weight oxyalkylene adducts thereof.

The process of this invention is found to be particularly suited to the preparation of polyether polyols from a $C_3$ or higher alkylene oxide as these, notably propylene oxide and to a lesser extent butylene oxide, are susceptible to isomerization resulting in unsaturation. Accordingly, the alkylene oxide used in the process of the present invention comprises propylene oxide or 1,2-butylene oxide, 2,3-butylene oxide, or mixtures of one or more of these oxides with one or more other alkylene oxides including ethylene oxide, styrene oxide, glycidol, epichlorohydrin or glycidyl ethers such as, for example, allyl glycidyl ether, phenyl glycidyl ether and butyl glycidyl ether. In a preferred embodiment, the alkylene oxide comprises propylene oxide, 1,2-butylene oxide or 2,3-butylene oxide optionally in admixture with ethylene oxide. In a highly preferred embodiment, the alkylene oxide consists essentially of propylene oxide. The amount of alkylene oxide used in the process is such to confer the desired molecular weight or hydroxyl equivalent weight to the resulting polyether polyol.

The catalyst used in accordance with the process of this invention to promote the alkoxylation reaction includes barium, strontium and their oxides, hydroxides, hydrated hydroxides, monohydroxide salts or mixtures thereof. The preferred catalysts are barium hydroxide, hydrated barium hydroxide and monohydroxide barium salts or mixtures thereof and the equivalent strontium compounds. Especially preferred is barium hydroxide or hydrated barium hydroxide. The concentration of the catalyst is such as to provide for the manufacture of the product within an acceptable time. Advantageously, the catalyst is present in an amount of from about 0.01 to about 50, more preferably from about 0.05 to about 30, and most preferably from about 0.08 to about 15 percent by weight based upon the weight of the initiator. The quantity of catalyst used to promote the reaction advantageously is such that the resulting polyether polyol, prior to neutralization or treatment to remove residual catalyst, contains less than about 20,000, preferably less than about 10,000 and most preferably less than about 5,000 ppm of the catalytic metal based on the weight of the end product present. If the resulting crude product contains an excess of catalyst, then efficient neutralization and/or filtration to remove the catalyst may not be possible.

The function of the processing aid is to provide for a resulting polyol which has a reduced unsaturation content relative to a like polyether polyol produced under equivalent conditions using the same initiator, oxide and catalyst but in the absence of such a processing aid. To this purpose, the processing aid is present in an amount of from about 0.1 to about 10, preferably in from about 1 to about 10, more preferably in from about 2 to about 8, and most preferably in from about 2.5 to about 7.5 weight percent, based on total weight of initiator.

The processing aid includes organic monohydroxyl- or dihydroxyl-containing substances or mixtures thereof having a molecular weight of at least 30, preferably at least 45. Suitable monohydroxyl containing substances include $C_{1-6}$ alcohols such as, for example, methanol, propanol, butanol and especially ethanol. Suitable dihydroxyl-containing substances include, for example, aliphatic diols, dihydroxyl-terminated ethers, dihydroxyl-terminated polyethers having a molecular weight of from about 150 to about 600, and preferably from about 150 to about 400. Exemplary of preferred aliphatic diols include 1,4-butandiol or 2,3-butandiol; of preferred dihydroxyl-terminated ethers include di(2-hydroxyethyl)ether or di(2-hydroxypropyl)ether; and of preferred dihydroxyl-terminated polyethers include poly(oxypropylene) diol or poly(oxyethylene-oxypropylene) diol and especially poly(oxyethylene) diol. Processing aids found to be particularly effective in reducing the unsaturation content of the resulting polyether polyol are poly(oxyethylene) diol with a molecular weight of about 200, and ethanol. Organic substances containing one or two hydroxyl groups and in addition active atoms associated with —COOH, —SH and —NHR functionality are to be considered as initiators when the total number of active hydrogens per molecule, including those associated with the —OH functionality, is 3 or more.

In the process of the invention, advantageously the processing aid is present in admixture with the initiator and catalyst prior to being contacted with the alkylene oxide. The reaction with alkylene oxide advantageously is conducted at a temperature within the range of from about 60° C. to about 80° C., preferably within the range of from about 75° C. to about 130° C. and more preferably within the range of from 85° C. to 125° C. The reaction is normally conducted in a closed system at a pressure generally not exceeding about 150 pounds per square inch gauge (psig)(1034 kPa), preferably not exceeding about 120 psig (827 kPa) and most preferably not exceeding about 75 psig (520 kPa). These pressures are maintained by controlling the feed rates of the alkylene oxide(s) and thus the quantity of oxide in the gaseous phase at the reaction temperature. Temperatures and pressures over and above these ranges are generally not beneficial to the quality of resultant product obtained, and products with a high level of color or unsaturation may be produced.

The residual catalyst in the polyols produced by the process of this invention may be removed and/or neutralized by any of the procedures well-known to those skilled in the art including, for example, coalesence or extraction activities, neutralization by acids such as phosphoric acid, sulfuric acid, acetic acid, formic acid and solid organic acids as described in U.S. Pat. No. 3,000,963. The catalyst may also be removed by the carbon dioxide finishing procedure as described in the Japanese Patent 55/092,733-A, or removed by adsorption on activated clay such as, for example, magnesium silicate. After removal and/or neutralization of the catalyst, the metal cation content of the polyol advantageously is less than about 500 ppm, preferably less than about 100 ppm and more preferably less than about 50 ppm. Total removal of the metal is rarely achieved and typically the polyol will contain at least 1, and more typically at least 5 ppm of metal. Residual metal concentrations over and above these ranges are generally not beneficial to the use of the product in the preparation of polyurethanes.

The polyether polyols prepared according to the process of this invention advantageously have an equivalent weight of from about 800, and up to about 4000, preferably up to about 3500, and more preferably up to about 2500. The resulting polyols can be further characterized in that advantageously they have a total unsaturation content of less than 0.100, preferably less than 0.080, preferably less than 0.050, more preferably less than 0.040 milliequivalents/gram polyol.

The so-obtained polyether polyols may be reacted with organic isocyanates, preferably polyisocyanates, to produce polymers containing urethane linkages or prior blended with other active hydrogen-containing compound(s) to provide a polyol composition to be used for preparing a polyurethane polymer. A polyol composition can comprise from 0.1 to 99.9 percent by weight of one or more polyether polyols prepared by the process of this invention.

When the polyols prepared by the process of this invention are reacted with polyisocyanates to manufacture polymer containing urethane linkages the resulting polymer can be a polyurethane elastomer or foam, or if the polyisocyanate is in a significant stoichiometric excess to the polyol the polymer can be an isocyanate-terminated prepolymer. When preparing a polyurethane foam or elastomer, the reaction optionally comprises other active hydrogen-containing compounds, catalysts, surfactants, stabilizers, fillers, dyes, flame retardants, blowing agents and other additives. Suitable processes for the preparation of polyurethane polymers are discussed in U.S. Pat. Nos. Re. 24514 and 3,821,130, and G.B. patent 534,258. Suitable equipment and processes for the preparation of polyurethane polymers are further discussed by J. H. Saunders and K. C. Frisch in *Polyurethanes Chemistry and Technology* Volumes I and II, R. E. Krieger Publishing Company, Inc., ISBN 0-89874-561-6.

The polyols prepared by the process of the invention are useful for the manufacture of polyurethane polymers in a variety of application areas. Areas include flexible slabstock and molded foam, carpet backing and rigid foams for laminate and insulative applications. Noncellular polyurethane polymers may also be prepared including elastomers suitable for use as coatings, shoe soles and molding applications.

SPECIFIC EMBODIMENTS OF THE INVENTION

The invention is illustrated by the following examples, but which are not to be construed as limiting the scope thereof. Unless otherwise stated, all parts are by weight. In the examples, unless otherwise stated, the feed rate of the alkylene oxide is such so as to maintain a constant pressure in the reactor of from about 40 to about 60 psig (about 275 to about 415 kPa gauge) until the desired quantity has been fed to the reaction.

The equivalent weight of the products produced is calculated From the hydroxyl number as observed by procedure ASTM E 326-69. Total unsaturation levels are determined by procedure ASTM D 2849-69. All unsaturation values relate to products in which the catalyst has been neutralized and/or removed by filtering.

The Following abbreviations are used to designate initiators (I), comparative initiators (I*), processing aids (A), and comparative processing aids (A*):

I-1: a glycerine-oxypropylene adduct with a molecular weight of about 255;
I*-2: 1,4-Butandiol;
I*-2,3-Butandiol;
I*-4: Dipropylene glycol;
I-5: Trimethylolpropane;
I*-6: Poly(oxyethylene)glycol of molecular weight 200;
A*-1: Water
A-2: n-Butanol;
A-3: 2-Butanol;
A-4: t-Butanol;
A-5: 1,4-Butandiol;
A-6: 2,3-Butandiol;
A-7: Ethanol
A-8: Di(2-hydroxypropyl)ether commonly referred to as dipropylene glycol (DPG)
A-9: Poly(oxyethylene)glycol of molecular weight 200.

EXAMPLE 1

Polyether polyols are prepared according to the following general procedure. Actual amounts of reactants and specific conditions are given in Table I. An initiator/catalyst mixture is prepared by adding to the initiator in a closed reaction vessel equipped with a stirrer, the catalyst barium hydroxide octahydrate in an amount of 32.5 weight percent based on weight of initiator present. The resulting mixture is brought to, and maintained at, a temperature of about 125° C. for one hour while applying a vacuum to reduce the water content to less than about 100 ppm. Water content can be observed by conventional methods including the Karl-Fischer titration procedure. To the so-obtained "dry" mixture is then added the processing aid in the given weight percent relative to the initiator present. The resulting mixture is then, under a nitrogen atmosphere, brought to the desired alkoxylation reaction temperature prior to commencing the introduction of propylene oxide. After feeding of the propylene oxide is completed the resulting reaction mixture is stirred for about 1 to about 4 hours until a near constant pressure within the reaction vessel is attained. The so obtained crude polyether polyol is then cooled to ambient temperature and subsequently treated with magnesium silicate to remove the alkoxylation catalyst. The hydroxyl number and unsaturation content of the polyether-polyols prepared are reported in Table I.

TABALE I

| POLYOL | Initiator// (pbw) | Processing Aid/wt % | Reaction Temp | Propylene Oxide (pbw) | Hydroxyl Number | Unsaturation Content (meq/gram) | % reduction |
|---|---|---|---|---|---|---|---|
| 1* | I-1//20.5 | / | 125° C. | 196.4 | 59 | 0.14 | / |
| 2* | I-1//20.2 | A-1//0.5% | 125° C. | 192.3 | 64 | 0.056 | 60 |
| 3 | I-1//20.6 | A-2//5% | 125° C. | 197.6 | 66 | 0.078 | 45 |
| 4 | I-1//20.1 | A-3//5% | 125° C. | 181.5 | 67 | 0.1 | 28 |
| 5 | I-1//21.0 | A-4//5% | 125° C. | 182.2 | 65 | 0.087 | 38 |
| 6 | I-1//20.3 | A-5//5% | 125° C. | 200.2 | 63 | 0.066 | 53 |

TABALE I-continued

| POLYOL | Initiator// (pbw) | Processing Aid/wt % | Reaction Temp | Propylene Oxide (pbw) | Hydroxyl Number | Unsaturation Content (meq/gram) | % reduction |
| --- | --- | --- | --- | --- | --- | --- | --- |
| 7 | I-1//20.1 | A-6//5% | 125° C. | 199.2 | 64 | 0.097 | 31 |
| 8* | I-2//11.0 | / | 125° C. | 197.9 | 54 | 0.074 | / |
| 9* | I-2//10.3 | A-1//0.5% | 125° C. | 199.6 | 56 | 0.058 | 22 |
| 10* | I-4//18.9 | / | 125° C. | 197.2 | 56 | 0.07 | / |
| 11* | I-4//19.2 | A-1//0.5% | 125° C. | 196.8 | 56 | 0.07 | 0 |
| 12* | I-1//25.4 | / | 110° C. | 226.0 | 62 | 0.052 | / |
| 13* | I-1//24.1 | A-1//0.5% | 110° C. | 216.7 | 64 | 0.024 | 54 |
| 14 | I-1//23.2 | A-4//5% | 110° C. | 199.3 | 69 | 0.031 | 40 |
| 15 | I-1//23.1 | A-5//5% | 110° C. | 199.9 | 67 | 0.034 | 35 |
| 16 | I-1//23.2 | A-7//5% | 110° C. | 111.3 | 67 | 0.026 | 50 |
| 17 | I-1//23.2 | A-8//5% | 110° C. | 200.1 | 74 | 0.025 | 52 |
| 18 | I-1//23.2 | A-9//5% | 110° C. | 198.9 | 59 | 0.023 | 56 |
| 19* | I-3//13.2 | / | 110° C. | 203.0 | 62 | 0.046 | / |
| 20* | I-3//13.2 | A-1//0.5% | 110° C. | 206.1 | 63 | 0.041 | 10 |
| 21* | I-4//19.0 | / | 110° C. | 202.2 | 65 | 0.028 | / |
| 22* | I-4//19.1 | A-1//0.5% | 110° C. | 198.3 | 63 | 0.021 | 25 |
| 23* | I-5//14.0 | / | 110° C. | 216.1 | 59 | 0.085 | / |
| 24* | I-5//13.8 | A-1//0.5% | 110° C. | 215.7 | 61 | 0.054 | 36 |
| 25* | I-6//18.7 | / | 110° C. | 205 | 70 | 0.041 | / |

*Comparative Example

When preparing polyols at 125° C., a significant reduction in the unsaturation level of polyether triols is obtained in the presence of various hydroxyl-containing processing aids besides water, notably 1,4-butandiol (Polyol 6). Similar observations are made when polyols are produced at a lower reaction temperature. Particularly of value as processing aid is ethanol (Polyol 16), DPG (Polyol 17) and poly(oxyethylene)glycol (Polyol 18).

These findings permit the preparation of polyether polyols having a reduced level of unsaturation without recourse to concomitant addition of small, and frequently difficult to control, amounts of water during the alkoxylation process. In the present invention the processing aid is employed in easily handled and controlled amounts. While ethanol is observed to function effectively in reducing the unsaturation content of the polyether polyol its presence reduces the overall functionality of the polyol and this should be taken into consideration when subsequently using the product to prepare, for example, a polyurethane polymer.

What is claimed is:

1. A process for preparing a polyether polyol having an equivalent weight of from about 800 to about 4000 by reacting an initiator containing at least three active hydrogen atoms per molecule with an alkylene oxide comprising propylene oxide or butylene oxide in the presence of a catalyst and a processing aid wherein the catalyst is barium, strontium; an oxide, hydroxide, hydrated hydroxide or monohydroxide salt, of barium or strontium; or mixture thereof; and the processing aid has a molecular weight of at least 30 and is an organic monohydroxyl- or dihydroxyl-containing substance or mixture thereof, the processing aid being present in from about 1 to about 10 weight percent based on total weight of initiator.

2. The process of claim 1 wherein the processing aid is a monohydroxyl-containing substance.

3. The process of claim 2 wherein the monohydroxyl-containing substance is a $C_{1-6}$ alcohol.

4. The process of claim 3 wherein the $C_{1-6}$ alcohol comprises ethanol, propanol or butanol.

5. The process of claim 1 wherein the processing aid is ethanol.

6. The process of claim 1 wherein the processing aid is a dihydroxyl-containing substance.

7. The process of claim 6 wherein the dihydroxyl-containing substance is an aliphatic diol, a dihydroxyl-terminated ether or a dihydroxyl-terminated polyether.

8. The process of claim 7 wherein the aliphatic diol comprises 1,4-butandiol or 2,3-butandiol.

9. The process of claim 7 wherein the dihydroxyl-terminated ether comprises di(2-hydroxyethyl)ether or di(2-hydroxypropyl)ether.

10. The process of claim 7 wherein the dihydroxyl-terminated polyether has a molecular weight of from about 150 to about 600 and comprises a poly(oxyethylene) diol, a poly(oxypropylene) diol or a poly(oxyethylene-oxypropylene) diol.

11. The process of claim 1 wherein the processing aid is a polyoxyethylene diol of about 200 molecular weight.

12. The process of claim 1 wherein the alkylene oxides consists essentially of propylene oxide.

13. The process of claim 1 wherein the catalyst is present in from about 0.01 to about 50 weight percent based on total weight of the initiator.

14. The process of claim 13 wherein the catalyst is barium hydroxide or a hydrated barium hydroxide.

15. The process of claim 13 wherein the catalyst is strontium hydroxide or a hydrated strontium hydroxide.

16. The process of claim 1 wherein the initiator contains from 3 to about 6 active hydrogen atoms/molecule.

17. The process of claim 16 wherein the initiator comprises glycerine, trimethylolpropane, methylglucoside, beta-(2-hydroxyethyl)glucoside, sorbitol, or oxyalkylene adducts thereof having an equivalent weight of up to about 500.

18. A process for preparing a polyether polyol having an equivalent weight of from about 800 to about 250 by reacting an initiator which comprises glycerine, trimethylolpropane, methylglucoside, beta-(2-hydroxyethyl)glucoside, sorbitol, or oxyalkylene adducts thereof having an equivalent weight of up to about 500 with propylene oxide in the presence of: i) from about 0.01 to about 50 weight percent based on total weight of the initiator of barium, strontium; an oxide, hydroxide, hydrated hydroxide or monohydroxide salt, of barium or strontium; or mixture thereof; and ii) a processing aid, present in from about 1 to about 10 weight percent based on total weight of initiator, comprising ethanol or a poly(oxyethylene) diol, a poly(oxypropylene) diol or a poly(oxyethylene-oxypropylene) diol which has a molecular weight of from about 150 to about 600.

19. A polyol produced according to the process of claim 1.

20. A polymer containing urethane linkages prepared by reacting an organic isocyanate with a polyol obtained according to the process of claim 1.

* * * * *